May 12, 1942.  H. R. TORRENCE  2,282,622
METHOD OF TREATING JUICES
Filed May 1, 1939  2 Sheets-Sheet 1

Inventor
HOMER R. TORRENCE, Deceased
By ROBERT C. MIZE
Administrator Of The Estate
By
H. Calvin White
Attorney May 12, 1942.  H. R. TORRENCE  2,282,622
METHOD OF TREATING JUICES
Filed May 1, 1939   2 Sheets-Sheet 2
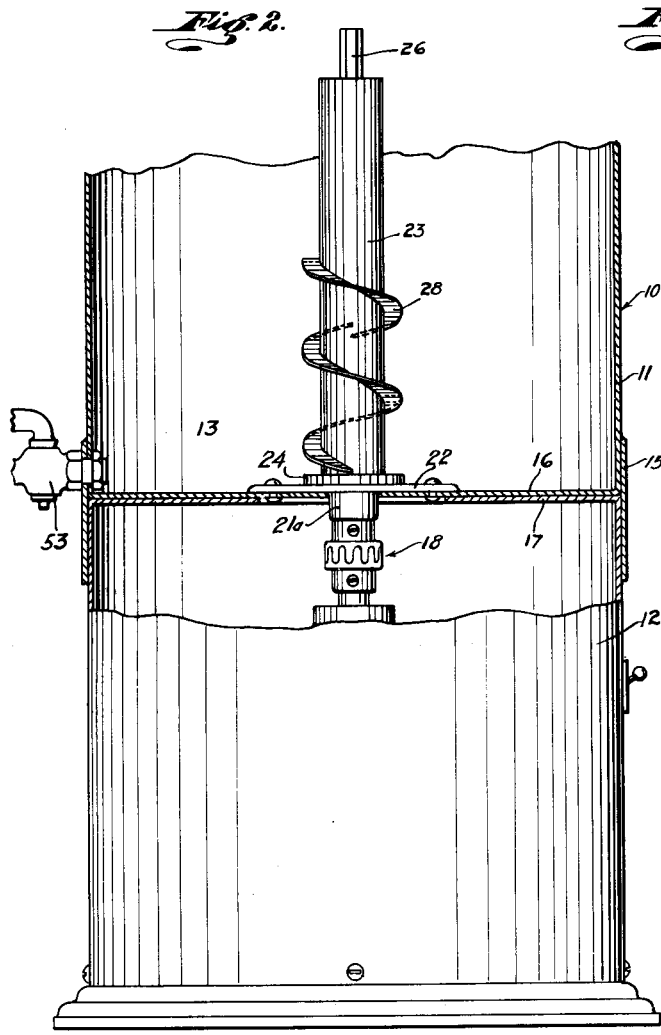
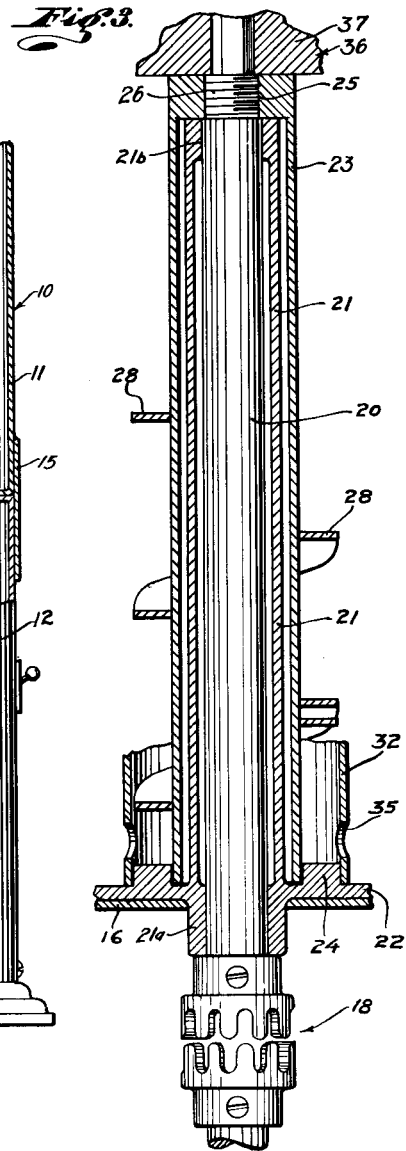
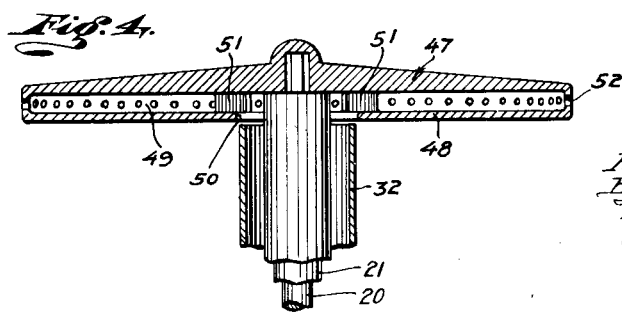
Inventor
HOMER R. TORRENCE, Deceased
By ROBERT C. MIZE
Administrator Of The Estate
By H. Calvin White
Attorney Patented May 12, 1942

2,282,622

UNITED STATES PATENT OFFICE 2,282,622

METHOD FOR TREATING JUICES

Homer Reid Torrence, deceased, late of South Laguna, Calif., by Robert C. Mize, administrator, Santa Ana, Calif., assignor to Gladys J. Torrence Application May 1, 1939, Serial No. 271,113

6 Claims. (Cl. 99—155)

This invention has to do generally with the treatment of packaged fruit and vegetable juices and concentrates, by which reference is had primarily to canned juices, for the purpose of refreshing such products by the removal of objectional contaminants and the restoration of properties characteristics of the fresh juices.

It is of course well known that as a result of canning and other processes by which the juice is packaged for preservation, the palatability and other desirable properties of the fresh juice are greatly impaired, due undoubtedly to heating or other treatment in the canning or packaging process, and possibly to internal conditions such as loss of pectin strength. Common among the objections to the packaged juices are their so-called "flat" taste, odors not possessed by the fresh juice, and a certain sliminess and lack of body due to changes brought about in the physical as well as chemical properties of the juice. These objectionable characteristics have to some extent limited the acceptance and demand for packaged juices, despite their convenient form of distribution and availability in many places where the fresh products cannot be obtained.

One of the primary objects of the invention is to provide a new and effective method whereby these undesirable properties of the juice may be obviated and a product obtained that in taste and quality greatly surpasses the untreated packaged juice. This method aims first at the removal of absorbed or dissolved gases and vapors contained in the juice and formed as a result of the canning process and maintenance of the juice sealed in the cans, which gases and vapors are largely responsible for the objectionable odor of the juice, and also to a material degree for its impaired taste. Also the method provides for the replacing of such dissolved or absorbed gases and vapors with air, for the purpose of to some extent giving the juice a refreshed taste and improving its physical properties, notably its body.

The treatments, i. e., removal of gases and vapors, and aeration of the juice, while in themselves beneficial for the purposes stated, are provided principally to condition the juice for further treatment to give it a more refreshed taste and improved body. In order to further restore the qualities of the fresh juice, the packaged product is treated to increase its air retaining capacity, or surface tension, and to freshen its taste. In accordance with the invention, both of these results may be obtained by combining with the packaged juice a suitable and preferably relatively small proportion of a fresh juice, which may be the same as, or a different kind from the packaged juice, and subjecting the juices to thorough mixing and aeration. The fresh juice revives the taste of the packaged juice by absorption in the latter of the fresh aroma and bouquet, and also increases its air retaining capacity to a degree such that the mixed product will absorb air and form and support bubbles like the fresh juice, and have improved body that is of importance to the palatability of the juice. The increased air retentiveness of the admixed juices, as compared with the packaged juice, is believed due principally to increased surface tension, although introduction of juice sacs of the fresh juice into the packaged product may assist materially in increasing its capacity to retain air.

While the invention broadly contemplates various specific ways of accomplishing the individual treatments and results referred to above, it will suffice to describe one typical and preferred method which has been found to operate efficiently and highly satisfactorily. The juice to be treated, for example canned citrus or vegetable juice, is subjected to mechanical agitation and distribution in a manner that effectively liberates the contained gases and vapors, and also preferably at the same time thoroughly aerates the juice. This agitation and division of the juice may be accomplished to a high degree of efficiency by directing the juice against a rotating element which operates to reduce the juice to a fine state of division and to project it centrifugally in that state within a space in which the juice is subjected to thorough aeration. Preferably the juice is thus projected against a solid surface so as to obtain the further benefit of impact separation.

Following removal of the gases and vapors, and aeration of the juice, or simultaneously with these treatments, a suitable proportion of the fresh juice is added. Most effective and intimate blending of the juices may be accomplished by also directing the fresh juice against the rotating element, so that the two juices are combined in divided condition at the periphery of the element, and are aerated together. Provision is made for maintaining the juice or juices while being treated as described, in a state of circulation which may be continued until the individual or combined treatments are complete.

The invention also contemplates a novel form of apparatus for treating the juices in the manner described. However, an understanding of the various features, objects and details of the apparatus, as well as those of the method, may be had most readily and to better advantage without necessity for further preliminary discussion, from the description to follow. Throughout the description reference is had to the accompanying drawings showing a typical and illustrative form of the invention, and in which:

Fig. 2 is a fragmentary view, partly in section, showing the reamer and screen assembly removed;

Fig. 3 is a fragmentary section of an enlargement of the impeller sleeve, seal tube and shaft assembly; and Fig. 4 is a view illustrating a variational feature of the invention.

Figure 1:
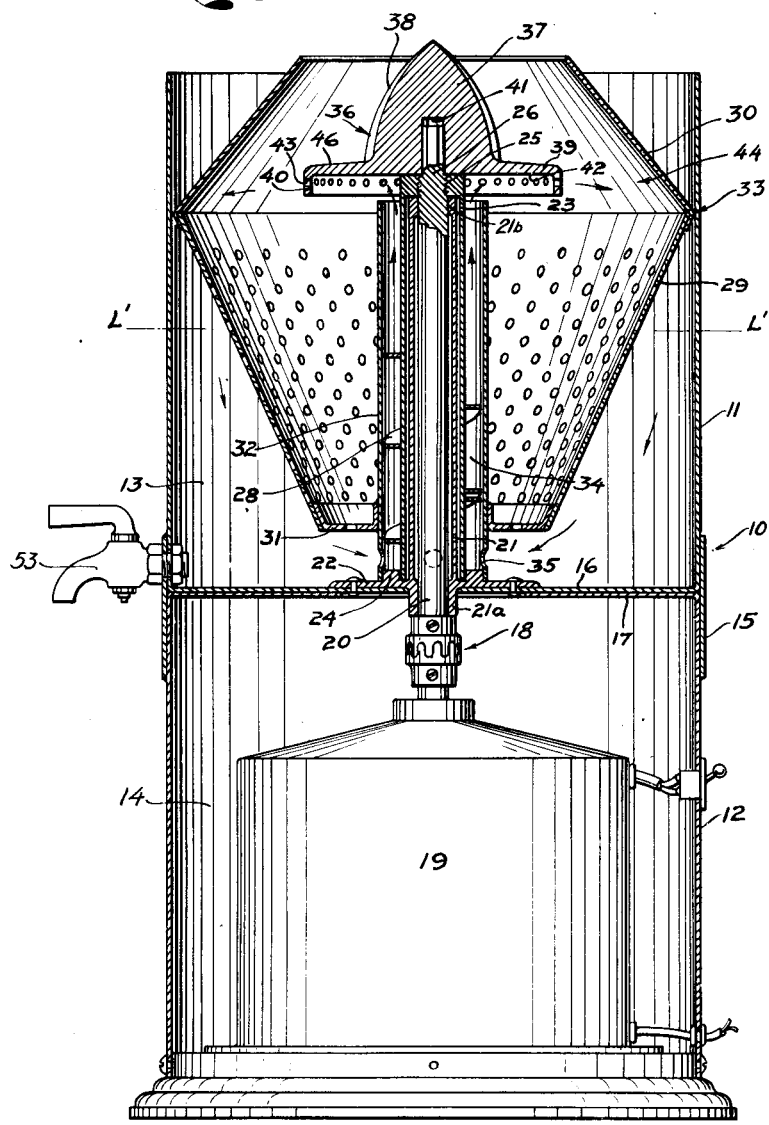
Fig. 1 is a vertical sectional view of the apparatus.

Referring first to Fig. 1, the apparatus comprises an outer casing or shell generally indicated at 10, that includes upper and lower sections 11 and 12 forming respectively an upper juice containing compartment 13 and a lower motor compartment 14. In the normal assembled condition of the apparatus, an annular depending sleeve 15 on the upper section 11 is fitted down about the shell 12 so that the bottom 16 rests on the top wall 17 of the lower section. A clutch connection 18 between the motor 19 and shaft 20 permits the upper section 11 and its contained parts to be removed from the lower section 12, for cleaning or other purposes, or for replacement by a different upper section assembly. Shaft 20 extends vertically from the motor within a liquid seal tube 21 having an integral base flange 22 secured to the bottom 16 of section 11, the lowermost portion 21a of the tube below flange 22 forming a radial bearing for the shaft. The upper end of the tube bore may also be reduced in diameter to provide a bearing at 21b for the upper end of the shaft. The tube extends above the liquid level in compartment 13 and thereby forms a seal preventing the flow of liquid downwardly along the shaft into the motor compartment 14. The shaft carries an impeller sleeve 23 extending downwardly about the tube 21 and journaled at its lower end within a boss 24 on the flange 22, the top of the sleeve being attached, as by screw threads 25 or other suitable connection, to the reduced diameter extension 26 of the shaft. The sleeve 23 carries a series of screw flights 28 which during rotation of the sleeve through its connection 25 with the shaft 20, projects the juice upwardly against the reamer base, as will presently appear.

Compartment 13 contains a removable assembly comprising a frustro-conical screen 29 attached at its upper end to an imperforate frustroconical shell 30 of reverse angularity, and connected at its lower end through a perforated channel-shaped flange 31 with a tube 32 surrounding and annularly spaced from the impeller sleeve. The screen assembly is securely positioned by engagement at 33 with the shell 11, and by fitting the lower end of tube 32 about the boss 24 as illustrated. The tube 32 forms with the impeller sleeve an annular vertically extending passage 34 from which the juice is upwardly expelled by the pumping action of the screw flights 28, and into the bottom of which the juice is admitted through openings 35.

The shaft carries on its upper end a rotating element, generally indicated at 36, which may conveniently take the form of a combined dispersing or atomizing disk and fruit reamer. Accordingly, in its preferred form, the element 36 consists of a reamer 37 having the usual surface ribs 38 and an integral, circular base 39 carrying a depending flange 40. The reamer may be detachably secured to the shaft in any suitable manner, as by fitting the polygonal cross-section reamer bore 41 about the correspondingly shaped shaft extension 26. Vertical support is given the reamer by resting its flat bottom undersurface 42 on the upper end of the impeller sleeve 23. Flange 40 has a circular series of apertures 43 at rather closely spaced intervals, so that the juice passing through them will be uniformly reduced to a fine state of division.

In accordance with the present method, the apparatus is assembled as illustrated in Fig. 1, and compartment 13 is filled with a packaged juice, for example, canned orange juice, to some intermediate level as indicated by line L'. The motor 19 then is started into operation to rotate the shaft, impeller and reamer at a high rate of speed, for example between 2000 and 3000 R. P. M., or above. The impellers 28 discharge the juice upwardly within passage 34 and project it at high velocity against the rotating undersurface 42 of the reamer. Initial removal of dissolved or absorbed gases and vapors from the juice occurs by virtue of the impact separating effect resulting from the juice being projected at high velocity against the surface 42. Then, due to its upward inertia under the influence of the impellers and the centrifugal force of the reamer, the juice is thrown rapidly outward along the under-surface of the reamer to the apertures 43. In being required to pass through these apertures rotating at high speed, the juice is reduced to finely divided form, and is projected in such form centrifugally from the periphery of the reamer base. It is desirable that flange 40 be given substantial thickness in order to insure thorough disintegration and atomization of the juice, which at least to a certain degree are enhanced by thickening the flange.

The juice being centrifugally thrown from the reamer into the air space at 44 is further and effectively separated from its contained gases and vapors, by reason of its fine state of division and intimate exposure to the air. At this point it may be mentioned that at their speed of rotation, ribs 38 on the reamer create a mild fan action, inducing upward circulation of air within the screen assembly, and expelling the released gases and vapors. Finally, the juice is subjected to further separating effect in being projected at high velocity across the air gap at 44 against the downwardly inclined imperforate wall 30. As will be understood, while the finely divided juice or mist is being dispersed into the space 44, it becomes thoroughly aerated and is thereby freshened in taste and improved in body by reason of the aeration. The continuous downward flow of juice from wall 30 washes any pulp or seeds down so that they accumulate in the lower portion of the screen, and the juice passes outwardly through the screen perforations for recirculation.

After removal of gases and vapors from the juice, or during such removal, a suitable proportion, around 20% to 25% being preferred, of fresh juice is added to the canned product, and desirably is combined therewith in a manner such that advantage is taken of the described treatment as a means for securing thorough blending and aeration of the admixed juices. Such combination of juices may be simply and effectively accomplished by expressing the added juice from the fresh fruit on the reamer 37. The fresh juice flowing outwardly over the top surface 46 of the reamer base is itself to some extent atomized by the high speed of rotation and is thrown beyond the periphery of the base where the fresh juice meets and is intimately comingled with the atomized juice leaving the apertures 43. The two juices thus are most effectively blended and aerated together while in a finely divided state. The seeds and pulp removed from the fruit are collected within the screen 29, the juices passing down through the openings 35, all in the general path indicated by the arrows. This continuous circulation of the juice is maintained until the desired proportion of fresh juice is added, and the mixture is thoroughly aerated.

For certain purposes, it may be desirable to increase the size and capacity of the apparatus in such a way as to necessitate enlargement of the diameter of the rotating element 36. In that event, the diameter may be enlarged beyond a distance through which the juice being projected against the under-surface of the element from passage 34, will adhere to or follow that surface out to the apertures 43. In accordance with the variational form of rotating element shown in Fig. 4, provision is made for retaining the juice within the element and positively projecting it outward through the apertures. Here the element 47 is of substantially disk form and comprises a lower integral wall 48 enclosing a space 49 into which the juice is projected from tube 32 through opening 50. Upon entering the space 49 the juice is thrown centrifugally and by the positive action of radial ribs or vanes 51, outwardly through the apertures 52. The reamer head is omitted in this variational form, to illustrate that if desired, the fresh juice may be previously extracted from the fruit and poured onto the top surface of the disk.

After blending and aeration of the juices as described, the reamer and screen assembly may be removed from the compartment 13, leaving the impeller sleeve and screw flight exposed as shown in Fig. 2. Between periodic withdrawals of the juice for service through cock 53, the impeller may be employed as agitator to maintain the juices in uniformly mixed condition.

What is claimed is:

1. The method of refreshing packaged juices of the character described, that includes removing undesirable gases and vapors from throughout the body of the juice, aerating the juice, and increasing the surface tension of the juice to increase its air retaining capacity by thoroughly admixing therewith a fresh juice simultaneously with said removal of gases and vapors from the first mentioned juice and aeration thereof.

2. The method of refreshing packaged juices of the character described, that includes continuously circulating a stream of the juice, and centrifugally projecting the circulated juice in finely divided form within an air space, thereby aerating the juice and removing undesirable gas and vapors therefrom.

3. The method of refreshing packaged juices of the character described, that includes continuously circulating a stream of the juice admixed with a fresh juice, and centrifugally projecting the circulated stream of admixed juices in finely divided form within an air space, thereby aerating the juices and removing undesirable gas and vapors therefrom.

4. The method of aerating fruit juices of the character described, that includes continuously circulating a stream of the juice, and centrifugally projecting the circulated stream of juice at high velocity and in finely divided form across an air space and against a solid surface.

5. The method of refreshing packaged juices of the character described, that includes continuously circulating a stream of the juice, expressing fresh juice from a fruit and immediately projecting the fresh juice together with the stream of the first mentioned juice at high velocity and in finely divided form across an air space, thereby intimately blending the juices and aerating them and removing undesirable gases and vapors from the packaged juice.

6. The method of refreshing packaged juices of the character described, that includes continuously circulating a stream of the juice, expressing fresh juice from a fruit and immediately centrifugally projecting the fresh juice together with the stream of the first mentioned juice at high velocity and in finely divided form across an air space and against a solid surface, thereby intimately blending the juices and aerating them and removing undesirable gases and vapors from the packaged juice.

ROBERT C. MIZE.
*Administrator of the Estate of Homer Reid Torrence, Deceased.*